United States Patent
Aoki

(10) Patent No.: US 8,053,079 B2
(45) Date of Patent: Nov. 8, 2011

(54) SHEET GLASS LAMINATE STRUCTURE AND MULITIPLE GLASS LAMINATE STRUCTURE

(75) Inventor: Shigeaki Aoki, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 265 days.

(21) Appl. No.: 12/310,982

(22) PCT Filed: Sep. 13, 2007

(86) PCT No.: PCT/JP2007/067833

§ 371 (c)(1),
(2), (4) Date: Mar. 13, 2009

(87) PCT Pub. No.: WO2008/032781

PCT Pub. Date: Mar. 20, 2008

(65) Prior Publication Data

US 2009/0311497 A1    Dec. 17, 2009

(30) Foreign Application Priority Data

Sep. 14, 2006 (JP) ................. 2006-249022

(51) Int. Cl.
*B32B 3/00* (2006.01)
*B32B 17/06* (2006.01)
(52) U.S. Cl. ............ 428/426; 428/195.1; 428/212
(58) Field of Classification Search .......... 428/195.1, 428/212, 426
See application file for complete search history.

(56) References Cited

U.S. PATENT DOCUMENTS

| | | | |
|---|---|---|---|
| 6,368,537 B1 | 4/2002 | Sato et al. | |
| 2005/0202264 A1* | 9/2005 | Smith et al. | 428/500 |

FOREIGN PATENT DOCUMENTS

| | | |
|---|---|---|
| DE | 202 02 223 | 10/2002 |
| EP | 0 787 568 | 5/2002 |
| JP | 5-310450 | 11/1993 |
| JP | 6-99547 | 4/1994 |
| JP | 7-97242 | 4/1995 |
| JP | 7-101755 | 4/1995 |
| JP | 2002-29776 | 1/2002 |
| JP | 2003-252658 | 9/2003 |
| JP | 2004-91244 | 3/2004 |
| JP | 2004-352569 | 12/2004 |
| JP | 2006-96612 | 4/2006 |
| WO | 96/12604 | 5/1996 |
| WO | 03/068501 | 8/2003 |

OTHER PUBLICATIONS

International Search Report dated Oct. 16, 2007 in the International (PCT) Application PCT/JP2007/067833 of which the present application is the U.S. National Stage.
International Preliminary Report on Patentability and translation of PCT Written Opinion mailed Mar. 26, 2009 for International (PCT) Application No. PCT/JP2007/067833 of which the present application is the U.S. National Stage.
Supplementary European Search Report issued Mar. 1, 2011 in corresponding European Application No. EP 07 80 7240.

* cited by examiner

*Primary Examiner* — Gwendolyn Blackwell
(74) *Attorney, Agent, or Firm* — Wenderoth, Lind & Ponack, L.L.P.

(57) ABSTRACT

A glass sheet laminate structure (10) produced by laminating at least three glass sheets (20) each having a thickness of less than 1 mm through an intermediate layer (30) between two adjacent glass sheets. The maximum variation $\Delta H max$ of the interval H between two adjacent glass sheets opposed to each other through the intermediate layer in connection with the central portion and the opposite end portions satisfies a relationship of $0\ \mu m < \Delta H max < 200\ \mu m$.

16 Claims, 5 Drawing Sheets

SHEET GLASS LAMINATE STRUCTURE AND MULITIPLE GLASS LAMINATE STRUCTURE

TECHNICAL FIELD

The present invention relates to a glass sheet laminate structure to be utilized as, for example, a transparent window material having a high strength and high toughness which finds use in building applications, on-vehicle applications, or electronic part applications, and a multiple glass sheet laminate structure obtained by further laminating glass sheet laminate structures of the above kind.

A glass sheet has been finding use in a large number of applications because of its translucency. A glass sheet article provided with a variety of properties has been utilized as: a window glass sheet for various buildings or a windshield for a vehicle; an electronic part such as a display window for an image display apparatus such as a liquid crystal display apparatus or a plasma display; or a window material for various packages for storing electronic parts.

A large number of inventions have been heretofore made with a view to: realizing performance necessarily requested of a glass sheet from those various applications such as a reinforced structural strength or reinforced rigidity, improved heat insulating property or improved heat shock resistance, or improved transparency at a high level; or overcoming the drawbacks of the glass sheet.

For example, Patent Document 1 discloses a laminate obtained by joining a glass sheet to an acrylic resin surface through a polyvinyl butyral resin as a laminate having the following characteristics: the laminate can be suitably used as a window for buildings, a glass for doors, or a window glass for vehicles, has a light weight, and is excellent in heat insulating property and safety. In addition, Patent Document 2 discloses a nonshattering glass having the following structure as a window glass sheet intended for crime prevention: a copolymer of tetrafluoroethylene, hexafluoropropylene, and vinylidene fluoride is used as an intermediate film to be interposed between borosilicate glass sheets. In addition, Patent Document 3 discloses that the temperature of a polyvinyl butyral film or vinyl chloride-based resin film is held and controlled in the range of 10° C. to 50° C. in order that a glued-laminated nonshattering glass used as a window glass for automobiles may be utilized as a front windshield glass excellent in acoustic vibration resistance and sound-insulating performance. Further, Patent Document 4 discloses a crime-prevention, bulletproof composite glass that brings together bulletproof nature and a light weight, the composite glass being obtained by interposing an ethylene-vinyl acetate copolymer resin sheet crosslinked by high-frequency heating between glass sheets.

Patent Document 1: JP 06-99547 A
Patent Document 2: JP 2006-96612 A
Patent Document 3: JP 05-310450 A
Patent Document 4: JP 2003-252658 A

DISCLOSURE OF THE INVENTION

Problems to be solved by the Invention

To deal with growing awareness in crime prevention resulting from, for example, a recent increase in number of crimes, various attempts have been made to improve additionally the performance of a window glass sheet for buildings and the like; from the viewpoint of an improvement in crime-preventing performance of a window glass sheet, various glass sheets each having such performance as described above have been conventionally developed. The viewpoint of an improvement in resistance of any such glass sheet comprehends: an improvement in durability against an external physical stress such as an impact force; the adoption of such a structure that, even when the glass sheet breaks, the resultant chips can be prevented from scattering to cause disasters; and an improvement in resistance to a heat shock caused by a heating instrument such as a lighter or a burner.

However, a glass sheet laminate having additionally sophisticated functions and showing various properties has been demanded in recent years; a mere improvement in strength-related or thermal performance of a glass sheet does not suffice to meet such demand.

An object of the present invention is to provide a glass sheet laminate structure capable of meeting such demand as described above and excellent in shock resistance, crime prevention nature, heat shock resistance, translucency, and air-tightness, and a multiple glass sheet laminate structure obtained by further laminating glass sheet laminate structures of the above kind.

Means for solving the Problems

A glass sheet laminate structure of the present invention in a glass sheet laminate structure obtained by laminating at least three glass sheets each having a thickness of less than 1 mm through an intermediate layer between two adjacent glass sheets, characterized in that, when a central portion having a length of 20 mm and including a middle point of a virtual line which has a length equal to 50% of a maximum overall dimension of a translucent surface of each of the glass sheets, which is parallel to a direction of the maximum overall dimension, and which adopts a center of the translucent surface as its middle point, and opposite end portions having lengths of 20 mm each from opposite ends of the virtual line are set on the virtual line, a maximum variation $\Delta Hmax$ of an interval H between the two adjacent glass sheets opposed to each other through the intermediate layer at each of the central portion and the opposite end portions satisfies a relationship of $0\ \mu m < \Delta Hmax < 200\ \mu m$.

Here, the glass sheet laminate structure of the present invention is constituted by laminating at least three glass sheets, so two or more intervals between the glass sheets are formed in the direction in which the glass sheets are laminated. However, at least the above interval H formed in closest proximity to one outermost layer of the glass sheet laminate structure has only to satisfy the relationship for the maximum variation $\Delta Hmax$ of the above interval H, i.e., $0\ \mu m < \Delta Hmax < 200\ \mu m$. In addition, the term "center of a surface" means a geometrical center of gravity in one translucent surface.

The inventors of the present invention have conducted researches on a stress to be applied to a glass sheet structure in a state where glass sheets are laminated. During the researches, the inventors have paid attention to the fact that the strength of the structure largely varies depending on how the glass sheets are laminated. The inventors have provided a glass sheet laminate structure having unprecedented stability and capable of realizing a high strength in conformity with findings found on the basis of such understanding. That is, the glass sheet laminate structure can exert excellent durability against a stress to be applied to the structure, especially an external impact force on its translucent surface when the maximum variation $\Delta Hmax$ of the above interval H is larger than 0 and less than 200 μm.

In the glass sheet laminate structure of the present invention, an interval between laminated glass sheets (the thickness of an intermediate layer) is observed to change. In addition, the inventors of the present invention have found that the change of the interval between the glass sheets not only has a buffer action on the application of an external impact stress but also improves adhesiveness between each glass sheet and the intermediate layer. The inventors have hit upon an idea that the utilization of the nature enables the construction of a structure bringing together flexibility and high rigidity, and having shock resistance. That is, when the change of an interval between glass sheets is periodically repeated in such state, an adhesive strength between each glass sheet and an intermediate layer becomes such that high resistance to an external force can be realized because of the following reason: the glass sheet and the intermediate layer not only are chemically bonded but also engaged with each other at their interface, an interfacial peeling threshold strength against a shear force occurring between the glass sheet and the intermediate layer during the deformation of the structure caused by an external force is improved, and the glass sheet and the intermediate layer serve to absorb an abrupt external force better than that in the case where they are completely parallel to each other. Further, the glass sheet laminate structure of the present invention can realize the following two-stage elasticity: while the structure shows relatively small elasticity by virtue of a flexible deformation effect of an intermediate layer at a portion where an interval between laminated glass sheets is large at the initial stage of the deformation of the structure due to the action of an external force, the structure shows relatively large elasticity by the application of the deformation resistance of the intermediate layer at a portion where a gap between the laminated glass sheets is small when the deformation due to the action of the external force becomes large. In addition, such change of an interval between glass sheets (the thickness of the intermediate layer) can be correctly managed by managing the maximum variation $\Delta Hmax$ of the interval H at each of the central portion and the opposite end portions on the above virtual line. That is, each glass sheet of which the glass sheet laminate structure of the present invention is constituted has a thickness of 1 mm or less, so the glass sheet has such structural elasticity that the glass sheet easily deflects along the direction of the maximum overall dimension of its translucent surface (for example, when the glass sheet has a longer side and a shorter side, the direction of the longer side). Therefore, the change of an interval between glass sheets in the glass sheet laminate structure can be correctly managed by the maximum variation $\Delta Hmax$ of the interval H at each of the central portion and the opposite end portions on the above virtual line because the change is significantly formed in the direction of the maximum overall dimension. In addition, specifying the maximum variation $\Delta Hmax$ of the above interval H within the range of 0 μm to 200 μm can provide the glass sheet laminate structure having the above characteristics. As described above, the glass sheet laminate structure of the present invention is a material having the following quite novel characteristics: the structure not only shows high resistance to an external force but also has nonlinear elasticity which changes in accordance with the advancement of the deformation of the structure.

The change of an interval between laminated glass sheets (the thickness of the intermediate layer) is formed so as to have a period of, for example, 0.1 mm to 100 mm for an arbitrary straight-line region in the translucent surface of the glass sheet laminate structure. In the glass sheet laminate structure of the present invention, the change of the interval may be formed by a repeating irregular shape called waviness present on one or both of the surfaces of the glass sheets opposed to each other through the intermediate layer. Alternatively, the change may be formed by a method including deforming and solidifying only the surface of each glass sheet by a heat treatment involving secondary transfer such as rolling after the molding of the glass sheet. Alternatively, the change may be formed by a method including partially removing the surface of each glass sheet by, for example, a chemical treatment involving irradiation with laser or masking to form a repeating irregular structure on the translucent surface.

Further, the change of the interval between the glass sheets (the thickness of the intermediate layer) can be managed with additionally high accuracy by defining an arbitrary (entire) region having a length of 20 mm on the above virtual line which is parallel to the direction of the maximum overall dimension and which adopts the center of the translucent surface as its middle point as a region where the above interval H is managed.

In a more preferred embodiment, the glass sheet laminate structure of the present invention is a glass sheet laminate structure obtained by laminating at least three glass sheets each having a thickness of less than 1 mm through an intermediate layer between two adjacent glass sheets, in which, at a straight-line portion having a length of 20 mm arbitrarily on a virtual line which has a length equal to 50% of a maximum overall dimension of a translucent surface of each of the glass sheets, which is parallel to a direction of the maximum overall dimension, and which adopts a center of the translucent surface as its middle point, a maximum variation $\Delta Hmax$ of an interval H between the two adjacent glass sheets opposed to each other through the intermediate layer satisfies a relationship of 0 μm<$\Delta Hmax$<200 μm. In a still more preferred embodiment, the glass sheet laminate structure of the present invention is a glass sheet laminate structure obtained by laminating at least three glass sheets each having a thickness of less than 1 mm through an intermediate layer between two adjacent glass sheets in which a maximum variation $\Delta Hmax$ of an interval H between the two adjacent glass sheets opposed to each other through the intermediate layer in a central region which has an area accounting for 40% or more of the area of the substantially rectangular translucent surface of each of the glass sheets and which includes the geometrical center of gravity of the translucent surface satisfies the relationship of 0 μm<$\Delta Hmax$<200 μm for an arbitrary dimension of 20 mm parallel to the surface of each glass sheet.

However, when the maximum variation $\Delta Hmax$ of the above interval H is 200 μm or more, the extent to which a light beam that has transmitted through the laminate structure is distorted in the translucent surface enlarges, with the result that the external appearance of the laminate structure deteriorates. On the other hand, when the maximum variation $\Delta Hmax$ of the above interval H is 0 μm, an effect of the present invention is hardly obtained.

The extent to which a light beam that has transmitted through the glass sheet laminate structure of the present invention deviates from the direction which the light beam will adopt when travelling in a straight line is preferably as small as possible when emphasis is placed on the optical performance of the glass sheet laminate structure. From such viewpoint, the maximum variation $\Delta Hmax$ is preferably as small as possible. In order that the external appearance may be additionally sophisticated, the $\Delta Hmax$ is preferably less than 180 μm, more preferably less than 150 μm, still more preferably less than 120 μm, still more preferably less than 100 μm, still more preferably less than 80 μm, or most preferably less than 50 μm. Meanwhile, the maximum variation $\Delta Hmax$ is preferably large to some extent from the following viewpoint: the strength characteristics of the glass sheet laminate structure of the present invention, that is, resistance to an external force and nonlinear elasticity should be sufficiently large. From such viewpoint, the ΔHmax is preferably larger than 0.1 μm, more preferably larger than 0.2 μm, still more preferably larger than 0.5 μm, still more preferably larger than 1 μm, still more preferably larger than 2 μm, still more preferably larger than 3 μm, still more preferably larger than 5 μm, or most preferably larger than 10 μm in order that additionally high strength characteristics may be realized. Of course, those upper and lower limits for the maximum variation ΔHmax are arbitrarily combined depending on, for example, the application of the glass sheet laminate structure of the present invention and the circumstance under which the glass sheet laminate structure is used.

Each glass sheet to be used in the glass sheet laminate structure of the present invention preferably has undulations on its surface shape to an extent equal to or larger than a glass sheet produced so as to be mounted on, for example, a liquid crystal display apparatus does. A surface quality standard "waviness" for a glass sheet for liquid crystal is an indicator specifying the surface shape of the glass sheet; for example, the amplitude of a surface undulation is requested to be 0.1 μm or less in at least one arbitrary section having a length of 20 mm. However, the surface quality of the glass sheet for liquid crystal may exceed a waviness standard limit requested of the glass sheet owing to a fluctuation in a certain factor for the production conditions in the step of producing the glass sheet. A glass sheet having such a surface shape that the amplitude of an undulation is, for example, 0.4 μm or 2 μm which exceeds the waviness standard is regarded as a defective item, and is pulverized so as to be recycled as a glass raw material. Even glass sheets each having such surface quality, if used in the glass sheet laminate structure of the present invention, can be expected to improve such strength characteristics of the glass sheet laminate structure as described above because the change of an interval between the glass sheets repeatedly appears.

Alternatively, the maximum variation ΔHmax of the above interval H may be caused to satisfy the relationship of 0 μm<ΔHmax<200 μm by the following procedure: the glass sheet laminate structure of the present invention is sandwiched between two high-rigidity caul plate materials each having an abutting plane subjected to a surface finish treatment so that its "waviness" described above may be 200 μm at maximum, and the surface waviness of each caul plate material is transferred by heat onto the glass sheet laminate structure abutting the caul plate material.

In addition, the dimensions of each glass sheet of which the glass sheet laminate structure of the present invention is constituted are not particularly limited as long as the thickness dimension of the glass sheet is less than 1 mm. For example, any one of the various thickness dimensions can be adopted: 0.9 mm, 0.85 mm, 0.8 mm, 0.77 mm, 0.76 mm, 0.75 mm, 0.73 mm, 0.71 mm, 0.7 mm, 0.68 mm, 0.65 mm, 0.63 mm, 0.61 mm, 0.6 mm, 0.5 mm, 0.3 mm, 0.2 mm, and 0.1 mm. On the other hand, the case where the thickness dimension of each glass sheet of which the glass sheet laminate structure is constituted is 1 mm or more is not preferable because of the following reason: although the rigidity of the glass sheet alone increases, the flexibility of the glass sheet reduces, and the brittleness of the glass sheet strongly appears, so it becomes difficult to provide freely the change of the interval H between laminated glass sheets required for the glass sheet laminate structure of the present invention to express excellent strength characteristics. In particular, a glass sheet having a thickness dimension of 2 mm or more used in a conventional nonshattering glass cannot be used in the glass sheet laminate structure of the present invention because the rigidity of the glass sheet alone is excessively high. In addition, the shape of an end face or corner of the glass sheet is not particularly limited either. For example, a processed shape such as a C face or an R face may be appropriately adopted as the shape of the end face of the glass sheet. In addition, a shape such as a C face or an R face can be adopted as the shape of the corner of the glass sheet.

With regard to the size of the translucent surface of each glass sheet, any one of the arbitrary dimensions including the following dimensions can be adopted as required as, for example, the longitudinal and horizontal dimensions of a glass sheet having a rectangular shape: 300×400 mm, 360×465 mm, 370×470 mm, 400×500 mm, 550×650 mm, 600×720 mm, 650×830 mm, 680×880 mm, 730×920 mm, 1,000×1,200 mm, 1,100×1,250 mm, 1,370×1,670 mm, and 1,500×1,800 mm. A glass sheet with longitudinal and horizontal directions having another ratio can also be used in the glass sheet laminate structure as long as processing conditions are available. Although an example in which the shape of each glass sheet of which the glass sheet laminate structure of the present invention is constituted is a rectangular shape has been described, the shape of the glass sheet is not limited to a rectangular shape, and may be an arbitrary shape.

A material for each glass sheet of which the glass sheet laminate structure of the present invention is constituted may be arbitrary as long as the glass sheet is a multi-component oxide glass having a desired hardness and a desired density. For example, a no-alkali glass, a borosilicate glass, or an aluminosilicate glass is a particularly suitable material applicable to the present invention; out of these glasses, the no-alkali glass is most preferable.

When, for example, a no-alkali glass is selected as a glass sheet applied to the present invention, the following material is a more preferable one: the glass composition of the material represented as a mass percentage in terms of an oxide is "50% to 85% of $SiO_2$, 2% to 30% of $Al_2O_3$, and 0.1 mass % or less of $R_2O$ (R=Na+K+Li)". In addition, the content of $Fe_2O_3$ as an iron component which each glass sheet applied to the present invention contains is preferably 0.2% or less, or more preferably 0.1% or less in order that the glass sheet may be provided with a cyan color or a brown color; the content is preferably 0.05% or less when the glass sheet must be colorless and transparent. In the present invention, the coloring of a material for each glass sheet of which the glass sheet laminate structure is constituted must be managed because the color of each of the glass sheets is emphasized by a constitution in which the glass sheets are laminated.

In addition, glass sheets molded by various molding methods can be adopted as the glass sheets of which the glass sheet laminate structure of the present invention is constituted. For example, a roll-out method, a redraw method, a downdraw method, or a float method can be employed as required.

In addition, any one of the various processing methods may be adopted as a method of processing each glass sheet of which the glass sheet laminate structure of the present invention is constituted so that the glass sheet may have desired dimensions. For example, cutting with a diamond wheel, water jet cutting, machining, cutting with a wire saw cutting apparatus, processing with a band saw cutting apparatus, a laser cutting apparatus, a bending-cracking processing machine, a grinding apparatus, or a machining apparatus can be separately used as required.

In addition, the number of glass sheets to be laminated in the glass sheet laminate structure of the present invention is more preferably 30 or less, or still more preferably 15 or less from an economic viewpoint.

In addition, in the glass sheet laminate structure of the present invention, any one of the various processing methods as well as the above-mentioned methods can be selected and adopted for processing only an end face of each glass sheet so that the end face may have a desired surface roughness. In addition, the end face alone can be treated with a desired chemical, and may be tempered by an air cooling method or ion exchange method by, for example, being subjected to hot processing.

Anyone of organic resins is filled in the intermediate layer. For example, there may be used, as required, a material such as polyvinyl butyral (PVB), a urethane resin, polymethyl methacryalte (PMMA), polystyrene (PS), a methacrylic resin (PMA), polycarbonate (PC), polyvinyl formal (PVF), polyacetal (POM), polypropylene (PP), polyethylene (PE), an AS resin (AS), a ethylene-vinyl acetate copolymer (EVA), polyamide (PA), polyethylene terephthalate (PET), polybutylene terephthalate (PBT), a diallyl phthalate resin (DAP), an AAS resin (AAS), an ACS resin (ACS), polymethyl pentene (TPX), polyphenylene oxide (PPO), polyphenylene sulfide (PPS), a butadiene styrene resin (BS), polyaminobis maleimide (PABM), an MBS resin (MBS), polyimide (PAI), polyarylate (PAR), polyallylsulfone (PASF), polybutadiene (BR), polyether sulfone (PESF), polyether ether ketone (PEEK), a silicon resin (SI), polytetrafluorinated ethylene (PTFE), polyfluorinated ethylene propylene (FEP), perfluoroalkoxy fluorinated plastic (PFA), and a heat-resistant fluorine-based resin. Those intermediate layers may be a single layer or multilayer structure. In addition, a plurality of intermediate layers may be formed of different materials.

In addition, additional performance can be imparted to each intermediate layer involved in the glass sheet laminate structure of the present invention by blending the intermediate layer with an appropriate amount of anyone of the various additives and drugs such as: a colorant; an absorber for a light beam having a specific wavelength such as an infrared ray or an ultraviolet ray; an antioxidant; a plasticizer; a defoaming agent; a thickener; a painting performance improver; and an antistatic agent. In addition, an oxide film made of, for example, tin oxide or indium oxide, a metal film made of, for example, gold, silver, copper, palladium, platinum, titanium, indium, or aluminum, an organic resin film, or the like can be appropriately selected and used as the intermediate layer.

A product obtained by the following procedure can also be used as a material applied to each intermediate layer involved in the glass sheet laminate structure of the present invention: a gel-like polymer previously brought into a partially crosslinked state is prepared, and is molded so as to serve as the intermediate layer. In this case, the shape of the partially crosslinked gel-like polymer may be arbitrary, and can be any one of the various shapes such as a powdery shape, a pellet shape, a ball shape, and a sheet shape. Of those, the sheet shape is particularly preferable because of the following reasons: the surface of the sheet can be subjected to a treatment such as the application of a desired surface treatment agent or functional film to the surface or the coating of the surface with the surface treatment agent or functional film, and fine air bubbles at the time of the molding can be easily removed.

A method of confirming that the maximum variation $\Delta$Hmax of the above interval H falls within the range of 0 to 200 μm in the present invention is as follows: a portion including a region where the maximum variation $\Delta$Hmax of the above interval H is managed is subjected to non-destructive tomography by an industrial CT scan, and the above interval H on a tomographic line is measured with the tomogram. The CT scan tomography enables high-resolution photography, and allows one to evaluate a change of the order of several tens of micrometers, so the CT scan tomography is preferable in identifying the structure of the glass sheet laminate structure of the present invention. In addition, the maximum variation $\Delta$Hmax of the above interval H in a region to be managed can be continuously measured by scanning a glass sheet with a laser multilayer film measuring sensor for detecting the position of a glass interface by measuring the intensity of reflected laser light. When the region where the maximum variation $\Delta$Hmax of the above interval H is managed becomes long, or one wishes to improve the efficiency of the measurement, the following methods are recommended for the management because of their simplicity: a method involving cutting the glass sheet laminate structure along a straight-line region where the maximum variation $\Delta$Hmax of the above interval H is managed with a water jet cutting apparatus or the like and observing the section across the thickness of the structure with a CCD microscope at a magnification of 10 or more to measure the change of the above interval H; and a transmitted light intensity measurement method involving causing light from a laser light source or xenon light source to transmit through the glass sheet laminate structure at an angle of incidence of about 10° to 80° and measuring the change of the above interval H from a change in intensity of the transmitted light. In the transmitted light intensity measurement method, a maximum variation $\Delta$H'max obtained by summing the variations of all the above intervals H of the glass sheet laminate structure present in the path of the transmitted light is measured, and the maximum variation $\Delta$Hmax can be calculated from $\Delta$H'max/n where n represents the number of glass sheets of which the glass sheet laminate structure is constituted. Further, the management can be performed by, for example, a method involving evaluating the change of the above interval H on the basis of the deformation of a certain geometrical pattern such as a lattice pattern observed through the glass sheet laminate structure. When a short-period fluctuation component is included in the measurement of the above interval H of the glass sheet laminate structure of the present invention by any such measurement method described above, a high-frequency component corresponding to a surface roughness is removed from the above interval H thus measured, and a waviness component as a long-period component is evaluated for the maximum variation $\Delta$Hmax of the above interval H. In order that the waviness component may be obtained, a filter waviness curve W having a cutoff value of, for example, 0.08 mm is preferably used for filtering the high-frequency component.

In addition, when the glass sheet laminate structure of the present invention has a Young's modulus (also referred to as "modulus of longitudinal elasticity", "Young's elastic modulus", or "Young's coefficient") of 30 GPa or more in addition to the above-mentioned characteristics, the glass sheet laminate structure has so high rigidity as to be a structure suitable for a window material for a building material or the like.

The case where the Young's modulus of the glass sheet laminate structure is less than 30 GPa is not preferable because of the following reason: when the structure is used as a window material having a large area for a building material or the like, the central portion of the structure is apt to deform readily, and, if the amount of deformation becomes excessively large, each glass sheet and the intermediate layer are apt to peel from each other.

In the case where the glass sheet laminate structure of the present invention has a Young's modulus of 30 GPa or more, the glass sheet laminate structure has various sufficiently high mechanical characteristics even when used as a member for a large structure. As a result, the degree of freedom in the design of a building can be increased.

The Young's modulus of the glass sheet laminate structure of the present invention can be measured by the following method: the amount of deformation of the laminate structure when a load is applied to the center of the laminate structure with a bending testing machine is detected with an operating transformer or the like. Alternatively, the Young's modulus may be measured by a measurement method such as a transverse vibration method or a pulse-echo overlap method as well as the above method.

Anyone of the various methods can be employed as a method of forming the glass sheet laminate structure of the present invention. For example, the following method is permitted: a resin to serve as an intermediate layer is injected into a gap between glass sheets previously held in a laminated state so that a laminate may be obtained, and then the resin is cured so that a laminate structure may be obtained. Alternatively, the following method is permitted: glass sheets are superimposed in a state where a sheet material made of a resin is inserted between the glass sheets, and the resultant is subjected as it is to a heat treatment or a compression treatment. Alternatively, a method involving repeating the following operation is permitted: a resin material serving as an intermediate layer having a predetermined thickness is applied onto one translucent surface of a glass sheet, a glass sheet is further superimposed on the resin material, and a resin material is applied onto the glass sheet. Alternatively, a method as a combination of two or more of such various methods as described above is permitted. That is, a method including the following steps can be adopted as a method of producing the glass sheet laminate structure of the present invention: the step involving laminating at least three glass sheets each having a thickness of less than 1 mm through an intermediate layer between two adjacent glass sheets and bonding the glass sheets through the adhesive layers to form a laminate and the step of cooling the laminate to cure the intermediate layers.

In addition, the glass sheet laminate structure of the present invention can be formed most easily by the application of a glass sheet obtained by previously bringing a glass sheet to be laminated into a state of being provided with a predetermined surface waviness or periodically coated with a transparent coating film or the like. The glass sheet laminate structure of the present invention can be formed by using a glass sheet obtained by processing or coating a glass surface by various surface formation means so that the surface may have an optimum surface waviness, an optimum coating film, or the like. Here, the various surface formation means include methods such as the polishing and machining of the glass surface in addition to the above-mentioned method. Although the methods such as polishing and machining can realize a desired wavy state, the following method that is the most simple one is preferably adopted: the surface wavy state of each glass sheet is adjusted by precisely adjusting molding conditions such as a molding rate upon molding of the glass sheet out of a raw material in a molten state and a cooling condition. In addition, any one of the various known methods has only to be employed as a method of coating the glass sheet.

In addition, the glass sheet laminate structure of the present invention preferably has the following characteristic in addition to the above-mentioned characteristics: a second glass sheet having a thickness dimension equal to or less than 95% of the average thickness dimension of the laminated glass sheets is provided for the glass sheet as at least one outermost layer through a joining film, and the joining film has a thickness dimension equal to or larger than the average thickness dimension of the intermediate layers. In this case, even when an impact stress is applied to the glass sheet laminate structure, the force applied to the internal structure of the glass sheet laminate structure is alleviated by the second glass sheet serving as the outermost layer of the glass sheet laminate structure, and hence the glass sheet laminate structure is constituted to have improved durability.

A material for the second glass sheet may be identical to or different from the material for each glass sheet of which the laminate structure is constituted. In addition, the second glass sheet may be a crystallized glass, a chemically strengthened glass, or a physically strengthened glass as required. In particular, the rigidity and strength of the glass sheet laminate structure can be efficiently improved by placing a crystallized glass sheet or strengthened glass sheet having high rigidity and a high strength as the second glass sheet on the outermost layer of the glass sheet laminate structure. Further, the second glass sheet may be a patterned glass sheet or a decorated glass sheet provided with a specific color.

In addition, the second glass sheet may be coated with a coating film having specific optical performance, a coating film having electrical performance, a protective reinforcing film, or a tacky film, and may adopt an optimum constitution depending on an application where the second glass sheet is used.

Further, with regard to the surface properties of the second glass sheet, the surface roughness of the translucent surface of the second glass sheet can be appropriately adjusted by, for example, sand blasting, laser processing, a polishing treatment, or an etching treatment with hydrofluoric acid. In addition, the shape of a peripheral end face of the second glass sheet may be different from or identical to that of each glass sheet, and any one of the various known processing methods can be adopted as a method of processing the peripheral end face.

Further, any film can be used as the joining film interposed between the second glass sheet and the glass sheet as long as the film can: bond and join the second glass sheet and the glass sheet; and realize a desired strength after the joining. An organic joining film, an inorganic joining film, or an organic-inorganic composite material-based joining film can be used. Further, such organic joining film may be a single-composition joining film composed of a material that can be utilized as an intermediate film, or may be a multilayer joining film constituted of multiple materials that can be utilized as intermediate films for imparting functionality to the glass sheet laminate structure. For example, the penetration resistance of the glass sheet laminate structure can be improved by using a joining film of such a three-layer constitution that a polycarbonate sheet having a thickness of 1 mm to 3 mm is sandwiched between EVA thin films each having a thickness of 0.2 mm. Further, the joining film may be constituted of a mixture of various additives.

In addition, the glass sheet laminate structure of the present invention preferably has the following characteristic in addition to the above-mentioned characteristics: the intermediate layers are each constituted of a sheet material using a thermoplastic resin. In this case, the laminate structure can be formed by an efficient step upon constitution of a laminated structure, and the molding quality of the laminate structure can be easily managed.

For example, each intermediate layer can be obtained by: molding a thermoplastic resin material such as polyvinyl butyral (PVB) or ethylene polyvinyl acetate (EVA) into a film shape in advance; holding the film in a state of being sandwiched between a glass sheet and another glass sheet; and subjecting the resultant in the state to heating or the like to join the film to each glass sheet.

For example, the above sheet material can be provided with irregularities at its proper sites in advance, or a sheet material to which a proper filler or the like has been added may be prepared in advance as the above sheet material. The irregularities may be ordered irregularities, or may be disordered irregularities. In addition, the filler can be adjusted so as to be mixed into the sheet material at the time of the molding of the sheet in advance, or can be embedded in a proper site of the sheet material after the production of the sheet material.

In addition, when, for example, polyvinyl butyral is used for constituting each intermediate layer according to the present invention, polyvinyl butyral preferably has a mass-average molecular weight of 10,000 to 350,000. Setting the mass-average molecular weight within such range can realize a preferable strength. Further, the heat resistance of the glass sheet laminate structure can be significantly improved by using an intermediate layer composed of a fluorine resin such as polytetrafluoroethylene (PTFE), polyfluoroethylene propylene (FEP), or perfluoroalkoxy fluoroplastic (PFA) and having improved surface-joining performance with a glass as each intermediate layer according to the present invention.

In addition, when the glass sheet laminate structure of the present invention has, in addition to the above-mentioned characteristics, such a characteristic that the glass sheet laminate structure is obtained by incorporating a pellet, fibrous substance, network substance, braided fabric, or woven fabric constituted of one or more kinds selected from the group consisting of a glass, a crystallized glass, a metal, and carbon into each intermediate layer, the glass sheet laminate structure can have sufficient rigidity and a sufficient strength, and can correspond to a variety of needs by adopting an optimum constitution depending on applications.

A material for each of the glass, the crystallized glass, the metal, and carbon described above is not particularly limited. For example, any one of the various multi-component glasses, quartz glasses, and the like can be used as the glass, and any one of the various crystallized glass materials can be utilized as the crystallized glass; the same holds true for the metal and carbon. Further, the size, shape, and the like of the pellet, fibrous substance, network substance, braided fabric, or woven fabric are not limited.

For example, when each intermediate layer contains glass fibers, the rigidity of the intermediate layer is improved, and hence the rigidity of the glass sheet laminate structure of the present invention can be significantly improved. Overall dimensions such as the diameter and length of each glass fiber incorporated into the intermediate layer are not particularly limited as long as the glass sheet laminate structure can be provided with desired dimensions. In addition, the composition of each glass fiber is not particularly limited either. For example, a material such as a silica glass, an E glass, a D glass, an H glass, an AR glass, or an S glass can be appropriately selected. In addition, when each intermediate layer contains special glass fibers each having a refractive index matching that of the resin material of the intermediate layer, the glass sheet laminate structure of the present invention can maintain such clear transmittance that no light scattering occurs when light transmits through the glass sheet laminate structure.

In addition, an appropriate amount of a coating agent capable of imparting desired performance can be applied to the surface of each glass fiber in each intermediate layer. For example, one or more kinds of coating agents such as a sizing agent, a binder, a coupling agent, a lubricant, an antistatic agent, an emulsifier, an emulsion stabilizer, a pH adjustor, a defoaming agent, a colorant, an antioxidant, an antifungal agent, and a stabilizer can be arbitrarily applied in an appropriate amount to the surface of each glass fiber. In addition, any such surface treatment agent or applying agent may be either a starch-based one or a plastic-based one.

In addition, when the glass sheet laminate structure of the present invention has, in addition to the above-mentioned characteristics, such a characteristic that the glass fibers each have a length dimension of 5 mm or less, the glass fibers can be uniformly dispersed with ease without being entangled, so problems resulting from a state where the glass fibers are unevenly dispersed such as a variation in strength of each intermediate layer and an unbalanced thickness dimension of the intermediate layer hardly occur.

In addition, the glass surface of the glass sheet laminate structure of the present invention can be inscribed with a material code, model number, or the like by using, for example, laser, etching, or sand blasting at a proper site of the glass sheet laminate structure as required.

Further, the glass sheet laminate structure of the present invention preferably has a transmittance of 30% or more in addition to the above-mentioned characteristics because the glass sheet laminate structure can be used as a lighting window for a building as well.

The phrase "has a transmittance of 30% or more" as used herein refers to a state where an average transmittance for visible light beams each having a wavelength in the range of 400 nm to 800 nm in terms of a linear transmittance including the surface reflection of the glass sheet laminate structure is 30% or more. The transmittance including the surface reflection of the glass sheet laminate structure has only to be measured with, for example, a known double-beam scan type spectral transmittance measuring apparatus in a state where the glass sheet laminate structure having predetermined dimensions and a predetermined area is placed on the measurement light side of the apparatus. In this case, when the surface of the glass sheet laminate structure is provided with a certain film material, attention must be paid so that the measurement may be performed for the glass sheet laminate structure including the film material.

In addition, when the glass sheet laminate structure of the present invention is used as a window material for a building or the like in such a manner that an object distant from, and on the opposite side of, the glass sheet laminate structure is visually observed through the glass sheet laminate structure, the glass sheet laminate structure preferably has as high a transmittance as possible; the transmittance is preferably 40% or more, or more preferably 50% or more.

Further, the surface of the glass sheet laminate structure of the present invention can be provided with a coating film by any one of the various methods. A refractive index-adjusting film for imparting optical performance, an impermeable film, an antireflection film, a protective film for improving weatherability, a conductive film, a charging film, or the like can be appropriately adopted as the coating film. In addition, a chemical vapor deposition method, a physical vapor deposition method, a spray method, a dipping method, a sticking method, a brush coating method, or the like can be appropriately employed as a method of providing the glass sheet laminate structure with the coating film.

In addition, the glass sheet laminate structure of the present invention may be turned into an entirely curved structure by pressing the glass sheets into a mold material molded in advance upon formation of the laminate structure.

In addition, an intermediate layer between glass sheets in the glass sheet laminate structure of the present invention can be provided with a transparent conductor or metal wiring as wiring for detection with a view to improving additionally the crime-preventing performance of the glass sheet laminate structure. In the case where such structure is adopted, when the glass sheet laminate structure is used as a window material or door material for a building, an action for destroying the glass sheet laminate structure such as rupture or penetration can be electrically detected with ease. In addition, a terminal of a specific sensor except those described above such as a vibration sensor or a temperature sensor can be sandwiched between the glass sheets.

In addition, a multiple glass sheet laminate structure of the present invention is characterized in that the multiple glass sheet laminate structure is of a multiple structure obtained by interposing a gap-filling film having a thickness dimension of 0.3 mm or more between glass sheet laminate structures of the above kind.

The case where the gap-filling film has a thickness dimension of less than 0.3 mm is not preferable because it may be impossible to join sufficiently strongly glass sheet laminate structures each having a large area.

Alternatively, the glass sheet laminate structure of the present invention may be constituted by recycling a glass sheet material to be mounted on a liquid crystal display apparatus.

To be specific, the following procedure may be adopted: after a liquid crystal display apparatus has been assembled once by using a no-alkali glass sheet material to be mounted on a liquid crystal display apparatus such as a product with a glass material code OA-10 or OA-21 available from Nippon Electric Glass Co., Ltd., a structure recovered from the liquid crystal display apparatus that has become unusable owing to, for example, the breakdown of the apparatus is adopted as the glass sheet laminate structure of the present invention. A no-alkali glass sheet material used in a liquid crystal display apparatus is particularly desirably recycled as a glass sheet to be utilized in the glass sheet laminate structure of the present invention because a thin-film transistor circuit formed on the surface of the material serves as a structure to change the glass sheet interval H regularly. Alternatively, a no-alkali glass of a thin-sheet shape obtained by remelting a discarded material and molding the molten product into predetermined dimensions may be used.

Effects of the Invention

As described above, the glass sheet laminate structure of the present invention is a glass sheet laminate structure obtained by laminating at least three glass sheets each having a thickness of less than 1 mm through an intermediate layer between two adjacent glass sheets, in which, when a central portion having a length of 20 mm and including the middle point of a virtual line which has a length equal to 50% of the maximum overall dimension of the translucent surface of each of the glass sheets, which is parallel to the direction of the maximum overall dimension, and which adopts the center of the translucent surface as its middle point, and opposite end portions having lengths of 20 mm each from the opposite ends of the virtual line are set on the virtual line, a maximum variation $\Delta Hmax$ of an interval H between the two adjacent glass sheets opposed to each other through the intermediate layer at each of the central portion and the opposite end portions satisfies the relationship of $0\ \mu m<\Delta Hmax<200\ \mu m$. Accordingly, the glass sheet laminate structure is suitable as a window material having a structure excellent in various properties such as shock resistance, crime prevention nature, and heat shock resistance, and capable of realizing various strength properties requested of a building or the like as well as low injuring performance to a substance or person to collide with the glass sheet laminate structure by virtue of flexibility at the time of small deformation of the glass sheet laminate structure.

Further, the shock resistance of the glass sheet laminate structure of the present invention can be improved, and the glass sheet laminate structure is provided with additionally high robustness when a second glass sheet having a thickness dimension equal to or less than 95% of the average thickness dimension of the three or more laminated glass sheets is provided for the glass sheet as at least one outermost layer through a joining film, and the joining film has a thickness dimension equal to or larger than the average thickness dimension of the intermediate layers. As a result, the glass sheet laminate structure can find use in an additionally wide variety of applications.

In addition, the case where the intermediate layers of the glass sheet laminate structure of the present invention are each constituted of a sheet material composed of a thermoplastic resin and having a proper thickness is suitable because of the following reasons: the material characteristics of the glass sheet laminate structure such as an elastic modulus, toughness, penetration resistance, a transmittance, and heat resistance can be easily adjusted to desired values by arbitrarily selecting the thickness of each intermediate layer and the number of laminated glass sheets, and a glass sheet laminate structure having stable quality can be efficiently produced.

In addition, when a pellet, fibrous substance, network substance, braided fabric, or woven fabric constituted of one or more kinds selected from the group consisting of a glass, a crystallized glass, a metal, and carbon is incorporated into each of the intermediate layers of the glass sheet laminate structure of the present invention, the rigidity and shock resistance of the glass sheet laminate structure are additionally improved, and hence the glass sheet laminate structure can realize sufficient strength characteristics even in the case where the glass sheet laminate structure has a large area.

Further, the multiple glass sheet laminate structure of the present invention is of a multiple structure obtained by interposing a gap-filling film having a thickness dimension of 0.3 mm or more between such glass sheet laminate structures as described above. Accordingly, even when one glass sheet laminate structure is insufficient in terms of strength, an improved strength enough to resist various shocks can be achieved by laminating multiple glass sheet laminate structures.

BEST MODE FOR CARRYING OUT THE INVENTION

Hereinafter, details about an embodiment of a glass sheet laminate structure of the present invention will be specifically described by way of examples.

Example 1

FIGS. 1 and 2 show explanatory and perspective views of a glass sheet laminate structure 10 of the present invention. FIG. 1(A) is a perspective view showing the entirety of the glass sheet laminate structure, FIG. 1(B) is a partial sectional view of the glass sheet laminate structure, and FIG. 1(C) is an enlarged sectional view of the main portion of FIG. 1(B). In those figures, reference numeral 20 represents each glass sheet of which the glass sheet laminate structure is constituted, reference numeral 20a represents a translucent surface, and reference numeral 30 represents an intermediate layer interposed between the two adjacent glass sheets.

As can be seen from FIGS. 1(A) and 1(B), the glass sheet laminate structure 10 is constituted by laminating the three glass sheets 20 each having a thickness dimension of 0.7 mm while aligning the edges of the glass sheets. Each of the glass sheets 20 has a translucent surface measuring 300 mm long by 500 mm wide. The composition of each of the three glass sheets 20 represented as a mass percentage in terms of an oxide is "60 mass % of $SiO_2$, 16 mass % of $Al_2O_3$, 10 mass % of $B_2O_3$, 14 mass % of MO (M=Ca, Mg, Ba, Sr, or Zn), and 0.01 mass % of $Fe_2O_3$." A glass sheet used in a liquid crystal display apparatus and having no-alkali composition is recovered and recycled as each glass sheet 20.

In addition, the intermediate layers 30 among the three glass sheets 20 are each a layer of polyvinyl butyral (PVB) having a thickness of 0.2 mm mixed with 0.5 mass % of glass fibers each having E glass composition and a length of 0.1 mm. The glass fibers, which are fiber materials having fine dimensions, are molded out of existing glass fibers by pulverization with an appropriate pulverizer such as a ball mill.

The glass sheet laminate structure 10 is prototyped so as to find applications in window materials for buildings. The structure 10 has a thickness dimension of 3 mm or less, and the end face side of the glass sheet laminate structure 10 is constituted so as to be capable of being fixed with a frame as required. In addition, the translucent surface 20a as the outermost surface of each glass sheet 20 is provided with a heat reflecting film (not shown), which reflects sunlight from the outdoors so that a specific feeling of glare when one shows in visually observing the translucent surface can be suppressed.

FIG. 2 is an explanatory view for explaining a fluctuation in dimension between the two adjacent glass sheets 20 opposed to each other through the intermediate layer 30 in the glass sheet laminate structure 10. The maximum overall dimension of the translucent surface of the glass sheet laminate structure 10 is 500 mm, and is defined as 100. A straight line having a length corresponding to 50, i.e., 250 mm is placed at the central portion of the transparent surface so that its middle point may coincide with the center of the translucent surface and the straight line may be parallel to the longer side of the translucent surface; the straight line is defined as a straight-line region 40. As partially shown in FIG. 1(C) in an enlarged fashion, a difference ΔHmax between the minimum Hmin and maximum Hmax of an interval H between the glass sheets is measured for a 20-mm straight-line segment at each of a central portion 41, and opposite end portions 42 and 43 of the straight-line region 40. As a result, measured values for the maximum ΔHmax of a fluctuation in dimension of the interval H between the glass sheets 20 at the portions 41, 42, and 43 were 24 μm, 63 μm, and 39 μm, respectively. The measured values ranged from 24 μm to 63 μm, and were each equal to or less than 200 μm, so it was able to be confirmed by a cutting observation method that the condition for the glass sheet laminate structure of the present invention was satisfied. In addition, measurement similar to that described above is performed for other multiple sites of a rectangular central region measuring 200 mm long by 300=wide which has an area accounting for 40% of the area of the substantially rectangular translucent surface of the glass sheet laminate structure 10 and which includes the geometrical center of gravity of the translucent surface. In this case as well, the ΔHmax ranges from 24 μm to 63 μm, so the presence of the change of the above interval H can be confirmed for the region as well. In order that such change of the glass sheet interval H might be obtained, an aluminum sheet material of 3 mm in thickness having the same dimensions as those of each glass sheet was provided with a surface having a maximum waviness of 100 μm by surface finish, and the glass sheet laminate structure of the present invention was sandwiched between two aluminum sheet materials subjected to the surface finish as caul plates so that the surface waviness might be transferred onto the glass sheet laminate structure. Any one of the various methods except the foregoing is also available; for example, the glass sheet interval H can be caused to change by appropriately adjusting the distribution, amount, or the like of a filler material to be added to each intermediate layer 30 or by using a sheet material provided with fine irregularities in advance as each intermediate layer 30.

Next, a method of producing the glass sheet laminate structure of the present invention will be described below in order.

First, no-alkali glass sheet materials each having the following composition represented as a mass percentage in terms of an oxide are prepared so that predetermined dimensions may be achieved in advance: 50% to 85% of $SiO_2$, 2% to 30% of $Al_2O_3$, and 0.1 mass % or less of $R_2O$ (R=Na+K+Li). Here, recycled products of glass sheets assembled once into a liquid crystal display apparatus are used, and are each brought into a sufficiently cleaned state through a washing step so that a stain, a deposit, or the like may not be present on the surface of the glass sheet. In order that a thin-film structure on the surface of each of those glass sheets may serve to change regularly the glass sheet interval H, various transparent thin-film circuits and optical thin-film layers constituted on the glass sheets are not removed. In addition, when a glass is produced so as to be adopted for the glass sheet laminate structure application, in the case where a glass sheet is molded from a glass melting furnace, a glass sheet having dimensions held to close tolerances can be obtained by: mixing predetermined raw materials; melting the mixture; homogenizing the molten product to provide a glass sheet; and molding the sheet by a molding method such as an overflow downdraw method.

Next, 20 g of a polyvinyl butyral (PVB) resin powder are dissolved in 100 ml of a mixed organic solvent composed of ethanol, toluene, and butanol at a ratio of 12:8:1. An amount equivalent to 0.5 mass % of glass fibers each having E glass composition and a length of 0.1 mm prepared in advance by pulverization with a ball mill is weighed and mixed into the solution, and the solution and the glass fibers are homogeneously mixed with a homogenizer so that a PVB solution may be prepared. Air bubbles involved at the time of the mixing are deaerated so that a homogeneous PVB solution containing no bubbles may be obtained.

A predetermined amount of the PVB solution is dropped onto a surface having a transparent, thin-film transistor circuit of a glass sheet held horizontally, and the PVB solution is repeatedly applied with a coater so as to have a uniform thickness. Then, the organic solvent is dried so that a PVB resin film having an average thickness of 200 μm may be formed. The thickness of the PVB resin film that can be formed by the method ranges from several tens of micrometers to several hundreds of micrometers, and the thickness of the resin film can be adjusted relatively freely. In addition, an external appearance failure such as foaming in a subsequent step can be alleviated by reducing the amount of the organic solvent remaining in the PVB resin film to the extent possible.

Two glass sheets each having the PVB resin film on one of its surfaces, and one glass sheet having no PVB resin film were laminated. An aluminum sheet material of 3 mm in thickness having the same shape and the same dimensions as those of each glass sheet was provided with a surface having a maximum waviness of 100 μm by surface finish, and the three glass sheets were sandwiched between two aluminum sheet materials subjected to the surface finish as caul plates so that the surface states of the materials might be transferred onto the glass sheets. The glass sheets in a laminated state and the aluminum caul plates were hermetically stored in a vacuum bag. Air remaining in a gap between a glass sheet and the PVB resin film was subjected to vacuum deaeration, and the resultant was subjected to hot pressing at a pressure of 10 kgf/cm$^2$ for about 20 minutes while being heated to about 100° C. so that the PVB resin film and the glass sheet might fuse with each other. Thus, the glass sheet laminate structure of the present invention was obtained.

Next, the evaluation of the glass sheet laminate structure of the present invention for mechanical performance will be described.

Example 2

In order that the glass sheet laminate structure of the present invention may be evaluated for its load-deformation characteristic by a three-point bending test, a liquid crystal glass sheet waviness non-standard product having a translucent surface measuring 50 mm long by 180 mm wide, and a thickness of 0.7 mm is prepared. In order that four, five, or six glass sheets of this type may be laminated, an ethyl polyvinyl acetate (EVA) resin sheet having a thickness dimension of 0.25 mm, and polyvinyl butyral (PVB) resin sheets having thickness dimensions of 0.38 mm and 0.76 mm are each shaped so as to have the same dimensions as those of each glass sheet. Then, each of the resin sheets is sandwiched between glass sheets to be laminated so that a laminate structure of the glass sheets and the resin sheets may be obtained. Then, the laminate structure of the glass sheets and the resin sheets is sandwiched between the abutting surfaces of aluminum caul plates each subjected to a surface treatment to have a maximum waviness of 50 μm. The laminate structure is brought into a state of being fixed under reduced pressure in a vacuum bag made of a resin. Next, the laminate structure is subjected to contact bonding under heat at an increased pressure of 10 kgf/cm$^2$ for 20 minutes while being heated. Thus, a test piece is obtained.

The test piece thus obtained was evaluated for its loading resistance by a 120-mm span three-point bending test with a strength testing apparatus manufactured by Shimadzu Corporation under a normal-temperature, normal-humidity environment at a crosshead speed of 0.5 mm/min.

FIG. 3 shows and explains the load-deformation behavior of the glass sheet laminate structure of the present invention (having a thickness of 5.16 mm) constituted of six glass sheets with an EVA resin film having a thickness of 0.25 mm in a three-point bending test as a representative example of the result of the evaluation. In FIG. 3, the axis of abscissa indicates the amount in which the test piece is depressed by a crosshead, that is, the displacement (mm) of the test piece, and the axis of ordinate indicates a load (kgf) applied through the crosshead. The evaluated test piece shows a displacement of 3.5 mm at a load of 62 kgf. At the load, the glass sheet of the glass sheet laminate structure positioned at the back surface of the surface of the glass sheet laminate structure which the crosshead of the testing apparatus abuts is broken, and the load is reduced to some extent. However, the glass sheet laminate structure of the present invention is a laminate of multiple glass sheets, so the load does not immediately return to zero, and the remaining five glass sheets are found to maintain the strength of the glass sheet laminate structure. As a result, the load reduces to 49 kgf. Further, when the crosshead is inserted downward, the displacement increases to 4.9 mm, and the load recovers to 61 kgf again. Thus, a second glass sheet is ruptured. When the crosshead is further inserted downward continuously, an increase in load and the rupture of a glass sheet subsequent to the increase repeatedly occur. Until the final glass sheet is broken at a displacement of 7.7 mm and the test piece finally loses its strength as a structural material, the glass sheet laminate structure maintains its strength as a structural material in spite of the fact that part of the glass sheets of which the test piece is constituted crack. Although a conventional nonshattering glass shows high rigidity and extremely slight deformation in its load-deformation behavior, the nonshattering glass shows such catastrophic limiting behavior that the nonshattering glass loses its strength immediately after the rupture of a glass sheet to break. On the other hand, the glass sheet laminate structure of the present invention has the following characteristic performance: in a three-point bending test, the glass sheet laminate structure shows a linear elastic behavior until the first glass sheet ruptures, and, thereafter, maintains its material strength as a composite material. The foregoing result shows that the glass sheet laminate structure of the present invention has a load-displacement characteristic excellent in ability to absorb external force energy, and has high toughness, that is, a high shock-absorbing ability that cannot be obtained with a conventional glass sheet or nonshattering glass. In addition, as can be seen from a linear relationship until the first glass sheet is broken, the Young's modulus of the glass sheet laminate structure of the present invention is as high as 10.9 GPa. In addition, a straight-line region of 90 mm in length including the center of the surface of the sample, i.e., the glass sheet laminate structure used in this test as its middle point and parallel to the direction of the longer side of the surface was evaluated for an interval H between the two adjacent glass sheets of the glass sheet laminate structure used in this test by a transmitted xenon light intensity measurement method. As a result, it was able to be confirmed that the maximum fluctuation ΔHmax of the dimension of the interval H for a length of 20 mm ranged from 17 μm to 36 μm. It should be noted that, in order that the intensity of xenon light might be converted into the glass sheet interval II, a calibration curve showing a correspondence between the intensity of transmitted light and the change of the glass sheet interval H was created in advance before the sample was evaluated for the glass sheet interval H.

Next, the evaluation of the glass sheet laminate structure of the present invention for mechanical performance by a four-point bending test will be described. FIG. 4 shows and explains the load-deformation behavior of the glass sheet laminate structure of the present invention (having a thickness of 5.08 mm) constituted of four glass sheets with a PVB resin film having a thickness of 0.76 mm in a four-point bending test. In FIG. 4, the axis of abscissa indicates the amount in which the test piece is depressed by the crosshead, that is, the displacement (mm) of the test piece, and the axis of ordinate indicates a load (kgf) applied to the test piece through the crosshead. The behavior of FIG. 4 is characterized in that the behavior is the following nonlinear elastic behavior: a required load until the crosshead is inserted downward by 2 mm is at most 2 kgf, which is a small value, but the load abruptly increases as the test piece is depressed by the crosshead in an amount equal to or larger than the displacement. In other words, the glass sheet laminate structure has the following specific nonlinear elasticity: the glass sheet laminate structure has two kinds of elastic deformation characteristics; specifically, while the glass sheet laminate structure shows a Young's modulus of 0.7 GPa, which is a relatively small value, for an initial displacement, the glass sheet laminate structure shows a Young's modulus of 8.9 GPa, which is ten or more times as large as that described above, for a displacement equal to or larger than a certain value. That is, when a force is applied to the glass sheet laminate structure of the present invention, the glass sheet laminate structure flexibly deforms to absorb energy as long as the displacement falls within a certain range; when the displacement increases, the glass sheet laminate structure can receive a large force by virtue of the second elasticity. The application of the glass sheet laminate structure of the present invention as a novel glass sheet material having the following characteristic can be expected from the utilization of the foregoing characteristic: for example, when the glass sheet laminate structure of the present invention and a person collide with each other, the glass sheet laminate structure of the present invention flexibly deforms at an initial stage to receive the person's body at a low shock, and then serves as a highly elastic body by virtue of the expression of the second property to absorb additionally large energy, thereby protecting the person's body. The flexible elastic behavior at the initial stage of the deformation probably originates from the following characteristic: the glass sheet interval H is caused to change by local deflection or irregularities of the glass sheet laminate structure. It was found that, although the high toughness shown in the above-mentioned three-point bending behavior and the nonlinear elasticity found in the four-point bending behavior were observed to change depending on the number of laminated glass sheets and the thickness of each intermediate layer, these properties were coexistent in the glass sheet laminate structure of the present invention. A straight-line region of 90 mm in length including the center of the surface of the sample, i.e., the glass sheet laminate structure used in this test as its middle point and parallel to the direction of the longer side of the surface was evaluated for an interval H between the two adjacent glass sheets of the glass sheet laminate structure used in this test with a laser multilayer film measuring sensor. As a result, the maximum variation ΔHmax of the dimension of the interval H for a length of 20 mm ranged from 23 μm to 45 μm.

Further, FIG. 5 collectively shows a change in Young's modulus obtained by performing a three-point bending test when the number of laminated glass sheets, and the thickness and kind of each intermediate layer are changed. Here, the axis of abscissa indicates the number of laminated glass sheets, and the axis of ordinate indicates a Young's modulus obtained by the three-point bending test. As can be seen from the figure, when the number of laminated glass sheets is increased for each kind of an intermediate layer, the Young's modulus of the glass sheet laminate structure reduces owing to a reduction in volume ratio of the glass to the intermediate layer resin. On the other hand, when the number of laminated glass sheets is fixed, a volume ratio of the glass to the intermediate layer resin increases as the thickness of each intermediate layer reduces, so the Young's modulus of the glass sheet laminate structure increases. The foregoing results have shown that an arbitrary Young's modulus can be obtained by adjusting the volume ratio (glass/intermediate layer resin) between the glass and the intermediate layer resin of which the glass sheet laminate structure of the present invention is constituted. A straight-line region of 90 mm in length including the center of the surface of the sample, i.e., the glass sheet laminate structure used in this test as its middle point and parallel to the direction of the longer side of the surface was evaluated for an interval H between the two adjacent glass sheets of the glass sheet laminate structure used in this test with a laser multilayer film measuring sensor. As a result, it was able to be confirmed that the maximum variation ΔHmax of the dimension of the interval H for a length of 20 mm ranged from 18 μm to 31 μm.

The foregoing result has revealed that the glass sheet laminate structure of the present invention can be provided with such high rigidity that the glass sheet laminate structure can be used as a structural material, or with extremely flexible elastic nature, by properly designing the constitution of materials to be laminated.

In addition, the test has shown the following: when a stress is applied to the glass sheet laminate structure of the present invention, each intermediate layer serves to suppress the shear deformation of each glass sheet, so the glass sheet laminate structure can alleviate a stress applied by the lamination of glass sheets. Accordingly, the three or more laminated glass sheets are not crushed at once by the application of a stress, but are gradually destroyed. Such performance as well as such deflected structure between laminated glass sheets provides the glass sheet laminate structure of the present invention with a structure excellent in shock resistance.

In addition, as is apparent from the foregoing description, the Young's modulus of the glass sheet laminate structure of the present invention can be additionally increased by appropriately changing production conditions for the glass sheet laminate structure. It has been revealed that selecting such conditions that the Young's modulus becomes as large as possible increases the value to 31 GPa, which is an additionally large value.

In addition, a heat shock resistance index $R=(E\alpha\theta^2)^{-1}$ of a glass sheet having a thickness of 0.7 mm in the glass sheet laminate structure of the present invention was calculated; E represented the Young's modulus ($kgf/mm^2$) of the glass sheet, θ represented the thickness (mm) of the glass sheet, and a represented the coefficient of thermal expansion (1/K) of the glass sheet. As a result, the value for the index was 20 K/kgf or more, so it was able to be confirmed that the glass sheet laminate structure was able to realize high heat resistance.

Further, in order that the glass sheet laminate structure of the present invention might be evaluated for its chemical durability, the glass sheet laminate structure of the present invention having the same constitution as that of Example 1 produced in advance was cut into ten 80-mm square shapes, and the ten samples were subjected to a boiling test for water resistance in boiling water for 12 hours. After the completion of the test, the state of the surface of the glass sheet laminate structure was evaluated for the presence or absence of abnormality by observation with a stereomicroscope at a magnification of 20 and with the eyes. As a result, it was revealed that the glass sheet laminate structure of the present invention did not show any reduction in its transmittance resulting from, for example, the alteration of the structure on its surface, and had such water resistance that the structure could be put into practical use without any problem.

As described above, the glass sheet laminate structure of the present invention not only had high shock resistance but also was excellent in heat resistance and water resistance. Accordingly, the structure was found to be suitable as a window material for various buildings.

Example 3

Next, another glass sheet laminate structure of the present invention will be described below.

FIG. 6 shows a partial sectional view of another glass sheet laminate structure 11 of the present invention. The glass sheet laminate structure 11 is obtained by laminating glass sheets 21 each subjected to a strengthening treatment and each made of a borosilicate glass, and intermediate layers 31 each interposed between two adjacent glass sheets. Each of the glass sheets 21 has a translucent surface measuring 300 mm by 400 mm, has a thickness dimension of 0.6 mm, and is in a state where a surface undulation exceeds 20 μm in a segment having a length of 20 mm. In addition, each of the intermediate layers 31 is constituted of a polyvinyl butyral resin sheet in which a translucent alumina filler is dispersed and mixed, and has a thickness dimension of 0.38 mm.

In addition, another structural characteristic of the glass sheet laminate structure 11 is as follows: a thin glass sheet (second glass sheet) 50 made of a transparent, crystallized glass is joined to one side of the glass sheet laminate structure 11 by a joining film 60 made of polyvinyl butyral. The crystallized glass 50 as a thin glass sheet has a thickness dimension of 0.48 mm, which is 80% of the thickness dimension of each glass sheet 21. In addition, the joining film 60 has a thickness dimension of 0.76 mm.

In the structure 11 as well, the following results are found for a fluctuation in dimension between the two adjacent glass sheets 21 opposed to each other through the intermediate layer 31: values for the maximum variation ΔHmax of the interval H between the glass sheets measured with a laser multilayer film measuring sensor at a 20-mm central portion and 20-mm opposite end portions in a straight-line region of 200 mm in length adopting the center of the translucent surface of each glass sheet of the glass sheet laminate structure 11 as its middle point and parallel to the longer side of the surface are 110 μm, 76 μm, and 140 μm, respectively, so the measured values range from 76 μm to 140 μm, and each fall within the range of 0 to 200 μm. Accordingly, the structure has high rigidity.

Example 4

FIG. 7 shows a partial sectional view of another multiple glass sheet laminate structure 12 of the present invention. The multiple glass sheet laminate structure 12 is of a constitution having a repeating structure obtained by joining, with a gap-filling layer 70, the two glass sheet laminate structures 11 each of which: is similar to that shown in Example 2; and is constituted of the glass sheets 21 and the intermediate layers 31. The gap-filling layer is formed by sandwiching a polycarbonate resin film with an adhesive layer, and has a thickness dimension of 0.64 mm.

In the structure 12 as well, the following results are found for a fluctuation in dimension between the two adjacent glass sheets 21 opposed to each other through the intermediate layer 31: values for the maximum variation ΔHmax of the interval H between the glass sheets for a length of 20 mm measured at a central portion and opposite end portions in a straight-line region of 200 mm in length adopting the center of the translucent surface of each glass sheet of each glass sheet laminate structure 11 as its middle point and parallel to the longer side of the surface are 110 μm, 76 μm, and 140 μm, respectively, so the measured values range from 76 μm to 140 μm, and each fall within the range of 0 to 200 μm. Accordingly, the structure has high rigidity.

Further, an example in which a glass sheet having a thickness smaller than that of each glass sheet of which the glass sheet laminate structure of the present invention is constituted is evaluated for its structural strength will be described.

Example 5

Two glass sheet laminate structures were prepared: one of them was obtained by laminating four glass sheets each having a thickness of 0.1 mm with an EVA resin film having a thickness of 0.25 mm, and the other was obtained by laminating six glass sheets each having a thickness of 0.1 mm. Two glass sheet laminate structures each having one of those laminated structures and two glass sheet laminate structures each having the other laminated structure were subjected to a three-point bending test, and the Young's modulus of a glass sheet laminate structure of each constitution was determined from the load-deformation behaviors of these structures. As a result, it was able to be confirmed that the glass sheet laminate structure obtained by laminating four glass sheets had a Young's modulus of 17 GPa, and the glass sheet laminate structure obtained by laminating six glass sheets had a Young's modulus of 7 GPa. It was revealed that those Young's moduli were extremely small values for glass sheet materials, and hence the glass sheet laminate structures each served as a material having excellent flexibility. It can be confirmed that the maximum variation ΔHmax of the interval H between the two adjacent glass sheets of each of the laminate structures used in this example measured by a transparent body boundary surface position measurement method with a laser microscope falls within the range of 62 to 108 μm. Accordingly, each of the laminate structures is found to be the glass sheet laminate structure of the present invention.

As described above, the glass sheet laminate structure of the present invention and the multiple glass sheet laminate structure of the present invention obtained by further laminating glass sheet laminate structures of the above kind are each a structure having high rigidity and excellent shock resistance, and are each a structural material having such quality as to be capable of finding use in a wide variety of applications including buildings and electronic parts.

Figure 1A:
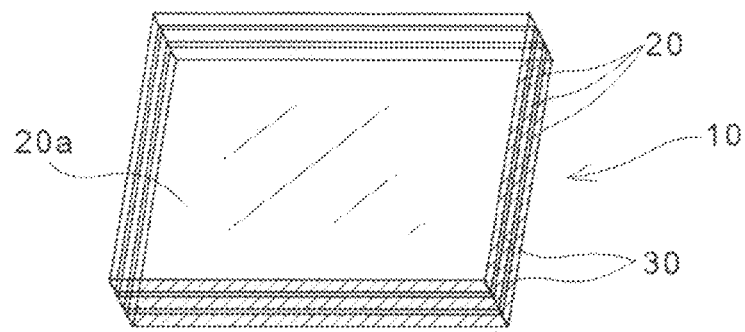
FIG. 1 are each an explanatory view of a glass sheet laminate structure of the present invention, FIG. 1(A) being a perspective view showing the entirety of the glass sheet laminate structure, FIG. 1(B) being a partial sectional view of the glass sheet laminate structure, and FIG. 1(C) being an enlarged sectional view of the main portion of the glass sheet laminate structure.
Figure 1B:
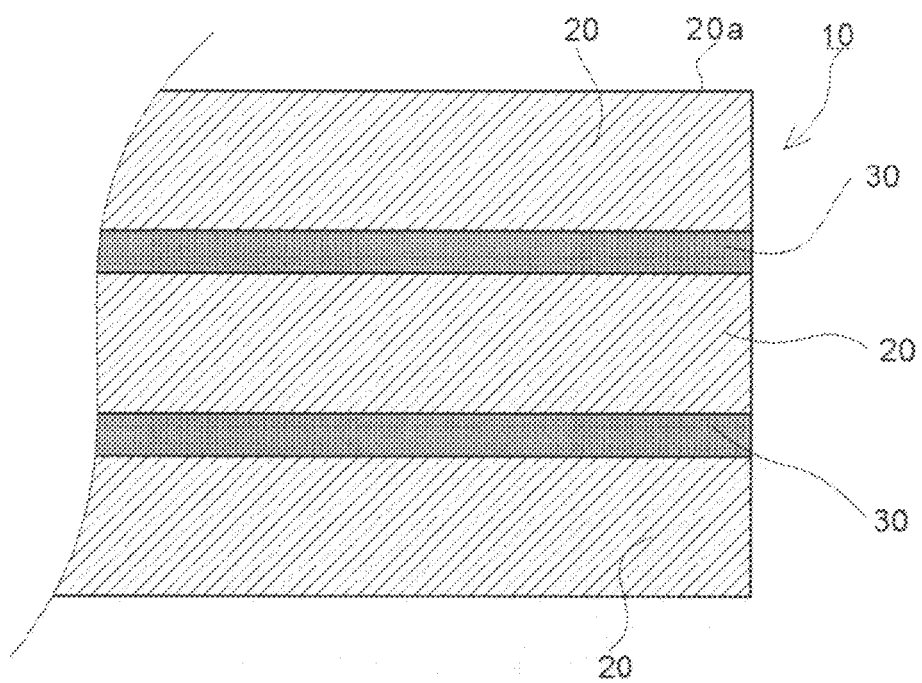
Figure 1C:
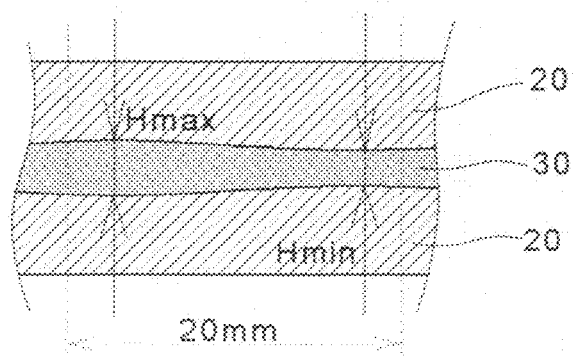
Figure 2:
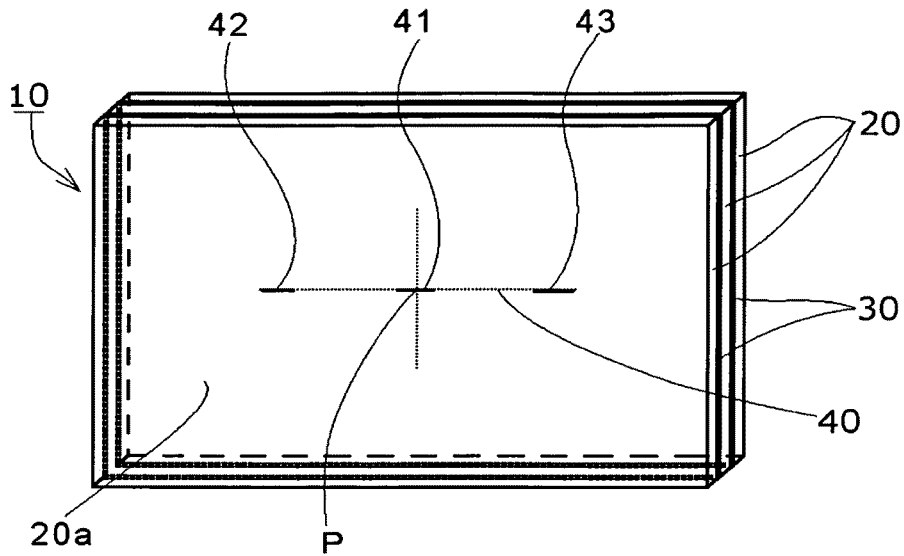
FIG. 2 is an explanatory view of a region where a glass sheet interval H of the present invention is observed to fluctuate by up to 200 μm.
Figure 3:
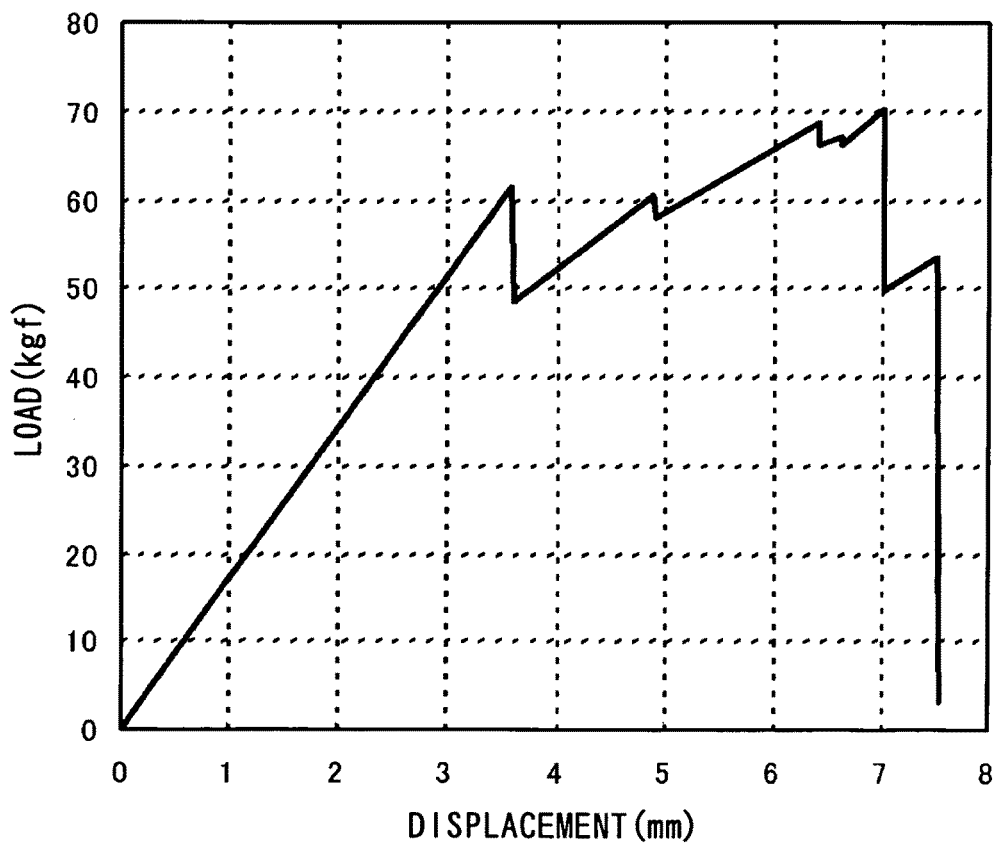
FIG. 3 is a graph showing the results of a three-point bending test on the glass sheet laminate structure of the present invention in which six glass sheets are laminated.
Figure 4:
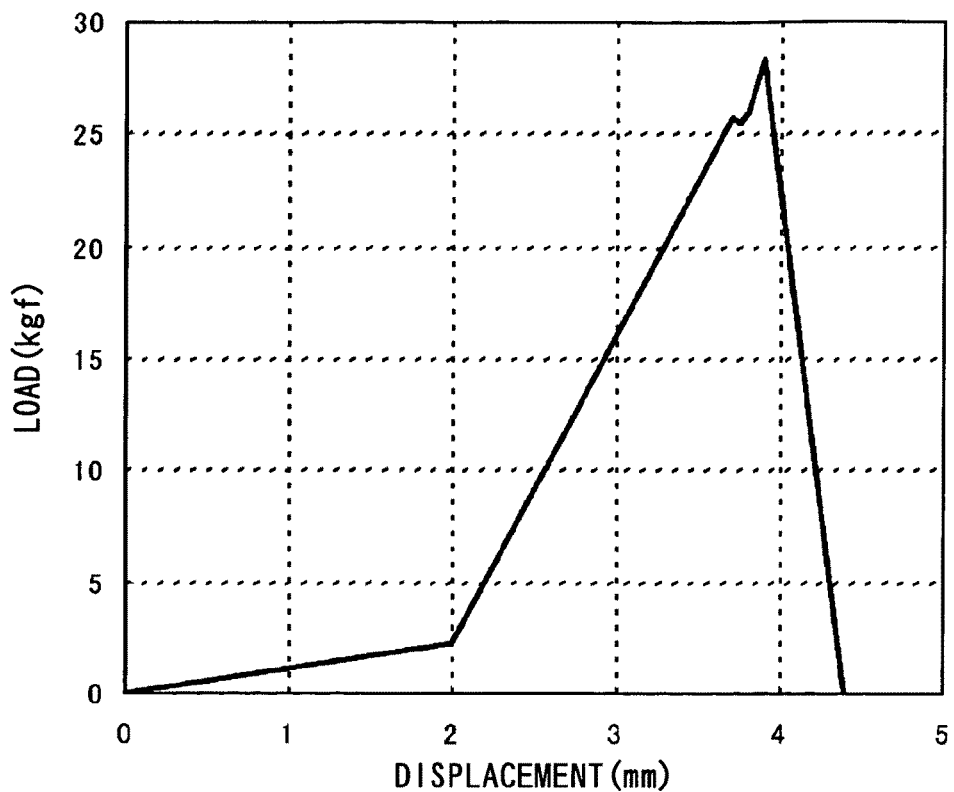
FIG. 4 is a graph showing the results of a four-point bending test on the glass sheet laminate structure of the present invention in which four glass sheets are laminated.
Figure 5:
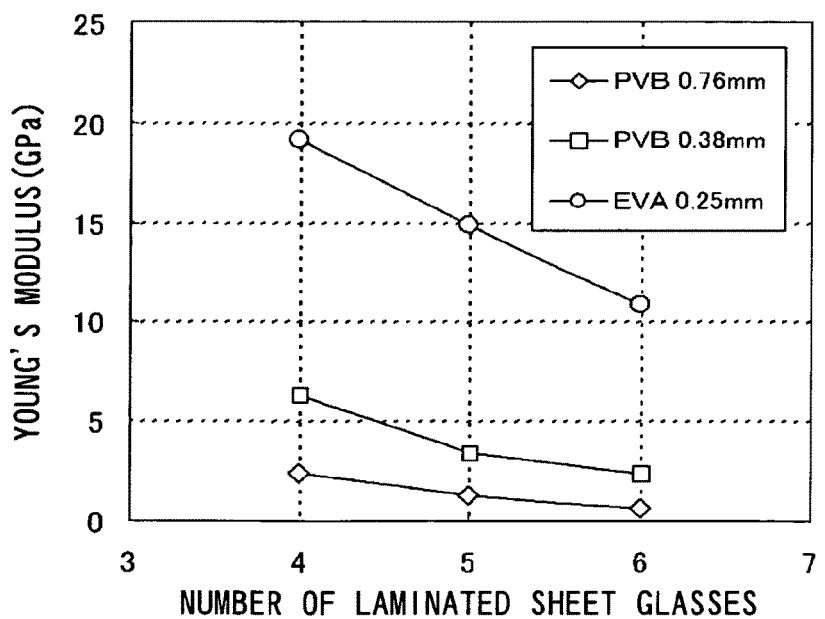
FIG. 5 is a graph showing the Young's modulus of the glass sheet laminate structure of the present invention measured by a three-point bending test.
Figure 6:
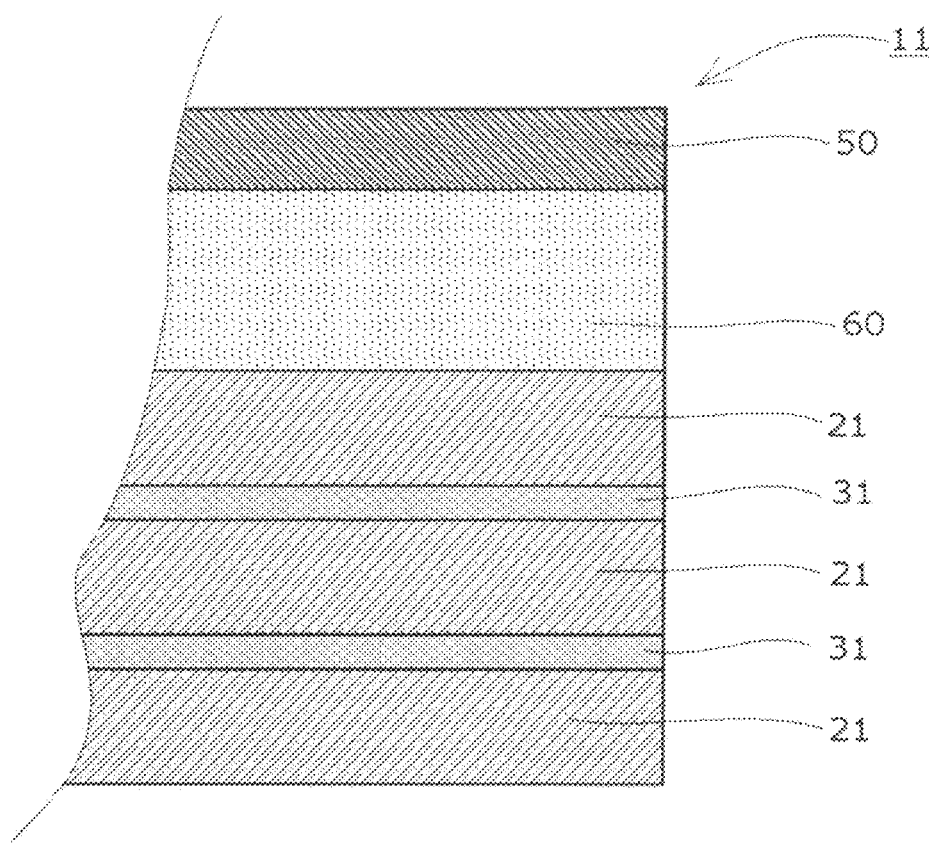
FIG. 6 is a partial sectional view of another glass sheet laminate structure of the present invention.
Figure 7:
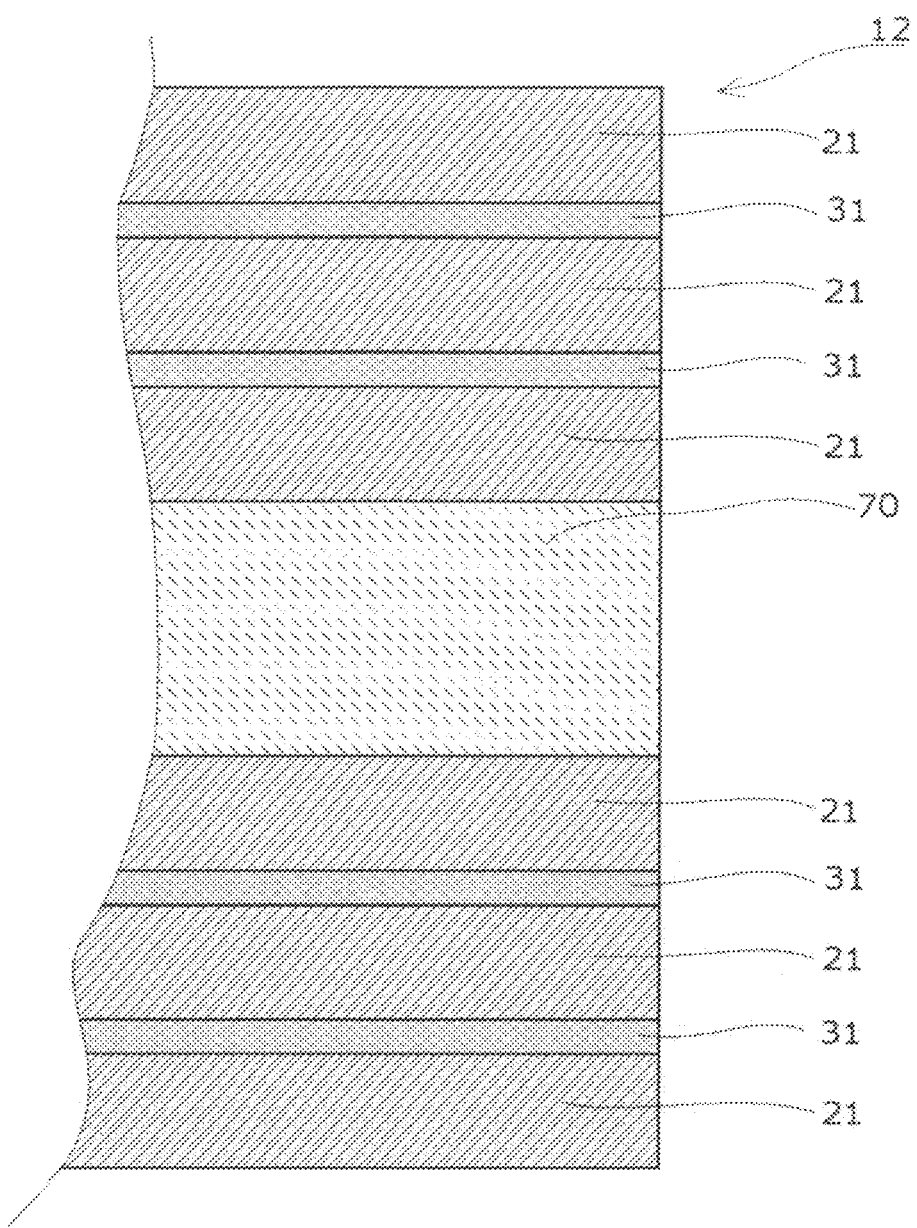
FIG. 7 is a partial sectional view of a multiple glass sheet laminate structure of the present invention.

DESCRIPTION OF SYMBOLS 10, 11 glass sheet laminate structure
12 multiple glass sheet laminate structure
20, 21 glass sheet
20a translucent surface
30, 31 intermediate layer
40 straight-line region parallel to the direction of the maximum overall dimension of a translucent surface
41 central portion of straight-line region 40

42, 43 opposite end portion of the straight-line region 40
50 thin glass sheet (second glass sheet)
60 joining film
70 gap-filling layer
H interval between two adjacent glass sheets
ΔHmax maximum variation
P center of a surface

The invention claimed is:

1. A glass sheet laminate structure obtained by laminating at least three glass sheets each having a thickness of less than 1 mm through an intermediate layer between two adjacent glass sheets, wherein when a central portion having a length of 20 mm and including a middle point of a virtual line which has a length equal to 50% of a maximum overall dimension of a translucent surface of each of the glass sheets, which is parallel to a direction of the maximum overall dimension, and which adopts a center of the translucent surface as its middle point, and opposite end portions having lengths of 20 mm each from opposite ends of the virtual line are set on the virtual line, a maximum variation ΔHmax of an interval H between the two adjacent glass sheets opposed to each other through the intermediate layer at each of the central portion and the opposite end portions satisfies a relationship of 1 μm<ΔHmax<200 μm.

2. A glass sheet laminate structure according to claim 1, wherein a second glass sheet having a thickness dimension equal to or less than 95% of an average thickness dimension of the three or more laminated glass sheets is provided for the glass sheet as at least one outermost layer through a joining film, and the joining film has a thickness dimension equal to or larger than an average thickness dimension of the intermediate layers.

3. A glass sheet laminate structure according to claim 1, wherein the intermediate layers are each constituted of a sheet material using a thermoplastic resin.

4. A glass sheet laminate structure according to claim 1, wherein a pellet, fibrous substance, network substance, braided fabric, or woven fabric constituted of one or more kinds selected from the group consisting of a glass, a crystallized glass, a metal, and carbon is incorporated into each of the intermediate layers.

5. A multiple glass sheet laminate structure comprising a multiple structure obtained by interposing a gap-filling film having a thickness dimension of 0.3 mm or more between the glass sheet laminate structures according to claim 1.

6. A glass sheet laminate structure according to claim 2, wherein the intermediate layers are each constituted of a sheet material using a thermoplastic resin.

7. A glass sheet laminate structure according to claim 2, wherein a pellet, fibrous substance, network substance, braided fabric, or woven fabric constituted of one or more kinds selected from the group consisting of a glass, a crystallized glass, a metal, and carbon is incorporated into each of the intermediate layers.

8. A glass sheet laminate structure according to claim 3, wherein a pellet, fibrous substance, network substance, braided fabric, or woven fabric constituted of one or more kinds selected from the group consisting of a glass, a crystallized glass, a metal, and carbon is incorporated into each of the intermediate layers.

9. A glass sheet laminate structure according to claim 6, wherein a pellet, fibrous substance, network substance, braided fabric, or woven fabric constituted of one or more kinds selected from the group consisting of a glass, a crystallized glass, a metal, and carbon is incorporated into each of the intermediate layers.

10. A multiple glass sheet laminate structure comprising a multiple structure obtained by interposing a gap-filling film having a thickness dimension of 0.3 mm or more between the glass sheet laminate structures according to claim 2.

11. A multiple glass sheet laminate structure comprising a multiple structure obtained by interposing a gap-filling film having a thickness dimension of 0.3 mm or more between the glass sheet laminate structures according to claim 3.

12. A multiple glass sheet laminate structure comprising a multiple structure obtained by interposing a gap-filling film having a thickness dimension of 0.3 mm or more between the glass sheet laminate structures according to claim 4.

13. A multiple glass sheet laminate structure comprising a multiple structure obtained by interposing a gap-filling film having a thickness dimension of 0.3 mm or more between the glass sheet laminate structures according to claim 6.

14. A multiple glass sheet laminate structure comprising a multiple structure obtained by interposing a gap-filling film having a thickness dimension of 0.3 mm or more between the glass sheet laminate structures according to claim 7.

15. A multiple glass sheet laminate structure comprising a multiple structure obtained by interposing a gap-filling film having a thickness dimension of 0.3 mm or more between the glass sheet laminate structures according to claim 8.

16. A multiple glass sheet laminate structure comprising a multiple structure obtained by interposing a gap-filling film having a thickness dimension of 0.3 mm or more between the glass sheet laminate structures according to claim 9.

* * * * *